United States Patent Office 3,528,002
Patented Sept. 8, 1970

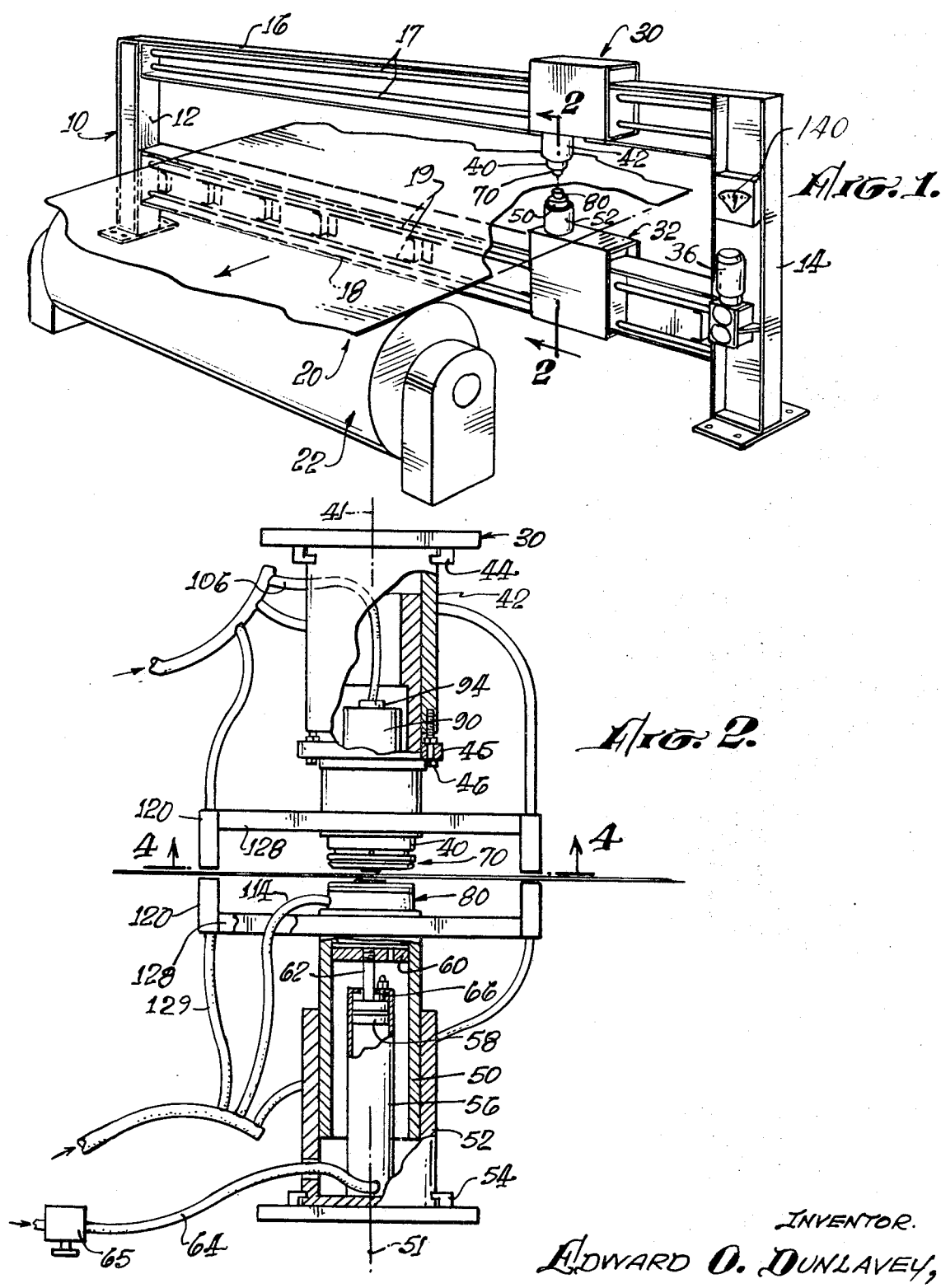

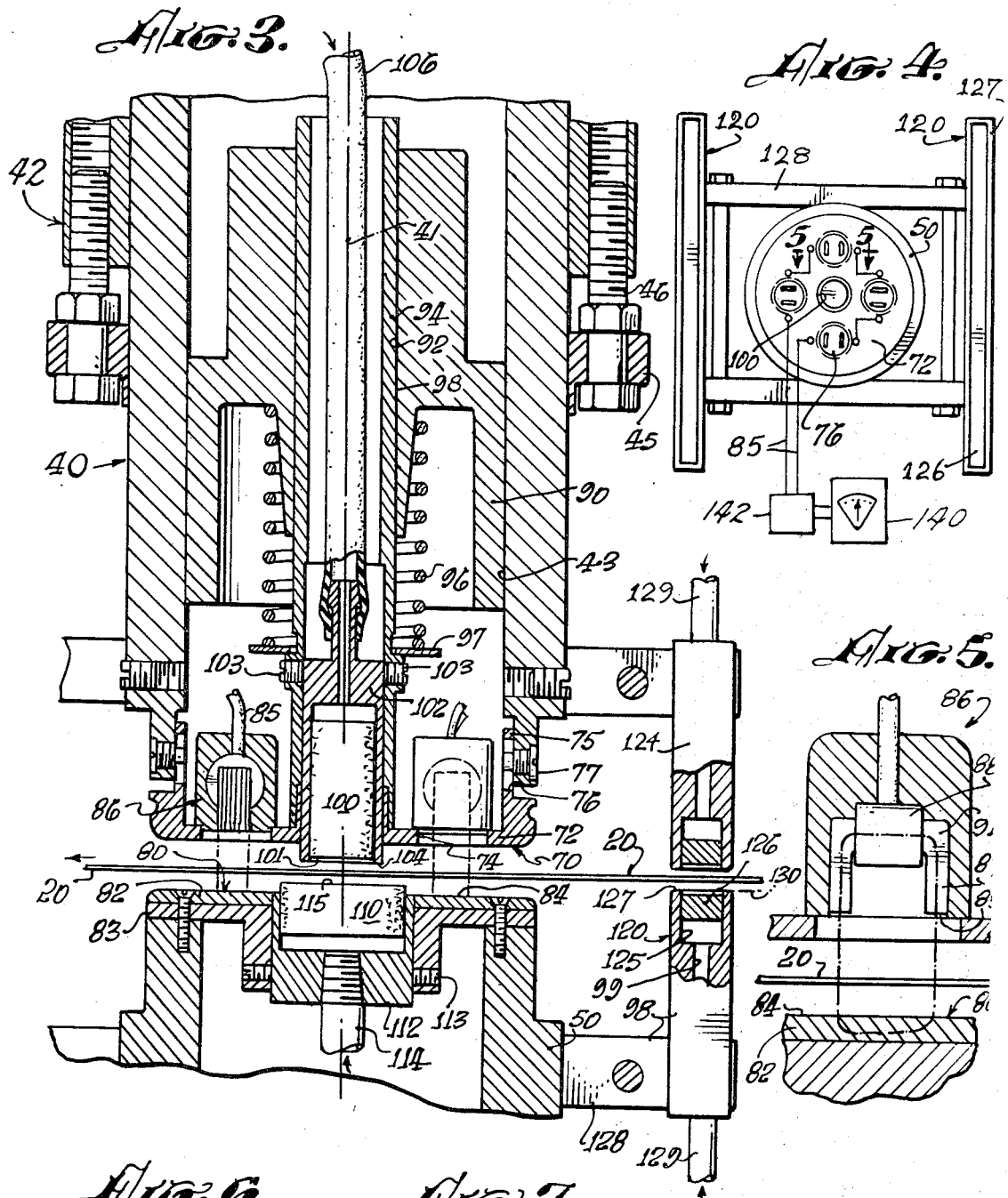

3,528,002
**CALIPER WITH AIR BEARINGS FOR CONTINU-
OUSLY MOVING SHEET MATERIAL**
Edward O. Dunlavey, Topanga, Calif., assignor to Conrac
Corporation, New York, N.Y., a corporation of New
York
Filed Jan. 4, 1968, Ser. No. 695,646
Int. Cl. G01b 7/00
U.S. Cl. 324—34                                12 Claims

ABSTRACT OF THE DISCLOSURE

The thickness of a moving web of sheet material is measured by two elements of an electromagnetic transducer. Air is continuously expelled through a porous plug in the center of each transducer head to produce an air film that maintains uniform spacing between the head and the sheet. The upper transducer element is biased downwardly by a spring relative to a floating mass, and its movement is damped viscously with respect to the same mass. The sheet web is guided to the caliper means by upper and lower auxiliary air bearings spaced from the caliper axis.

---

This invention has to do generally with measuring the thickness of sheet material, and is concerned more particularly with instrumentation capable of measuring the thickness of a moving web of material, as during its manufacture.

A primary object of the present invention is to permit continuous measurement of the thickness of sheet material during its manufacture, without interrupting the normal continuous movement of the sheet. Such continuous measurement provides much closer control of the product, leading to higher quality and also permitting appreciable economy of material by substantially eliminating variations in thickness.

A further object of the invention is to permit accurate measurement of sheet material without actually touching either surface of the sheet. That is a necessary requirement for an on-line caliper, since any contact with moving sheet material tends to mark the surface.

A further object of the invention is to provide an on-line caliper for sheet material such as paper, such that the caliper can be moved transversely across the width of the moving sheet, and thereby give direct and immediate indication of any lack of transverse uniformity in the sheet thickness. Since paper is normally manufactured in widths up to about 15 feet, it is therefore necessary to measure a paper thickness, typically of the order of 5 mils, at a distance approximating 8 feet from the edge of the web.

Those and other objects of the invention are accomplished by utilizing an electromagnetic transducer comprising two mutually spaced elements which produce a signal representing their spacing. The transducer elements are mounted on opposite sides of the moving sheet material in mutual axial alignment in such a way that each element is maintained at uniform distance from the sheet. That distance is defined by maintaining a continuous air film between the sheet material and the working face of the transducer element. In preferred form of the invention one transducer element is normally mounted in fixed position and the moving sheet is maintained at a uniform distance from it by an intervening air film. The other transducer element is axially movable and is yieldably urged toward the sheet material by a constant biasing force. Its approach to the moving sheet is limited to a predetermined uniform spacing by a second air film.

The described air films are produced by mounting a porous plug at the center of the working face of each transducer element with its outer face projecting from the plane of that working face. Air is supplied under constant pressure to the inner face of the porous plug and is expelled from its outer face, flowing radially outward between that face and the surface of the sheet, forming an air cushion. For any given air supply pressure, the thickness of that cushion is a well-defined function of the biasing force urging the transducer elements together, the effective "stiffness" typically corresponding to a spring constant of the order of 1000 pounds per inch. With the spacing of each transducer element from the adjacent face of the moving sheet accurately defined by such films of moving air, the output signal from the transducer accurately represents the thickness of the sheet material.

A great advantage of the described caliper structure is that neither caliper head needs to be supported by mechanical means in precise relation to the other or to the position of the sheet material. Hence those heads can be mounted on respective carriages that are movable transversely of the web along ways whose accuracy need not approach the accuracy of measurment of the sheet thickness. Any tendency of the support mechanism to introduce variations in the axial spacing between the transducer elements during such transverse movement is compensated by the described action of the air flow cushions, which maintain the sheet continuously at uniform distance from the "fixed" element and maintain the "movable" element at uniform distance from the sheet. Any slight departure of the transducer elements and their associated air bearings from axial alignment during traverse is compensated, in accordance with a further aspect of the invention, by suitable relative dimensioning of the opposing elements.

A further aspect of the invention concerns damping of the axial movement of the transducer element that is mounted movably with relation to its support. It has been found unsatisfactory to provide normal damping action directly between the transducer element and its carriage or other support structure, since vibration then tends to be transmitted from the main support to the transducer. In accordance with the invention, a relatively heavy mass is mounted on the support for free relative movement perpendicular to the sheet material, essentially without damping. The transducer element is mounted on that floating mass for relative movement in the same direction, which is typically parallel to the transducer axis. Any component of vibration parallel to that direction of movement is absorbed by the floating mass, and suitable damping may be provided between that mass and the transducer element without transmitting such vibration to the latter. The transducer element is preferably biased toward the sheet only by the weight of the relatively heavy floating mass, which may be transmitted to the element via a suitable spring. Axial movement of the transducer element relative to the fixed support then produces no change in the biasing force. Any vibration transmitted to the other transducer element from its support is of such period that the described air cushions are able to produce compensating movement of the paper web and of the movable transducer element.

In accordance with a further aspect of the invention, the plane of the sheet material being fed to the caliper is approximately defined by opposing air cushions that are produced by suitable auxiliary porous structures spaced upstream and downstream of the caliper heads. Those structures preferably constrain the sheet to a plane that is slightly offset above the sheet position as it passes between the caliper heads.

In accordance with a further aspect of the invention, at least one of the caliper heads and its associated outer air bearing structures are automatically retracted from the sheet web in response to loss of air pressure, thereby avoiding possible damage to the web. Such retraction is also available under manual or other control to permit the caliper to be traversed off web, as to facilitate calibration.

In accordance with a further aspect of the invention, the pole faces of the opposing transducer elements are spaced apart more widely than the working surfaces that define the air cushions. Although that reduces somewhat the sensitivity of the transducer response, it permits the response to be made inherently substantially linear within the normal range of sheet thicknesses, and it also facilitates absolute calibration of the caliper when off web.

A full understanding of the invention and of its further objects and advantages will be had from the following description of illustrative mechanism for carrying it out.

In the drawings:

FIG. 1 is a perspective representing schematically an illustrative embodiment of the invention;

FIG. 2 is an axial section at enlarged scale on line 2—2 of FIG. 1;

FIG. 3 is a section corresponding to a portion of FIG. 2 at further enlarged scale;

FIG. 4 is a section on line 4—4 of FIG. 2;

FIG. 5 is a section on line 5—5 of FIG. 4 at enlarged scale; and

FIG. 6 and 7 are schematic sections, corresponding generally to a portion of FIG. 3 and representing two types of instrument misalignment.

As represented somewhat schematically in FIG. 1, a main machine frame is indicated generally by the numeral 10, with the vertical posts 12 and 14, and with the upper and lower parallel beams 16 and 18 extending horizontally in vertically spaced relation between the posts. Those posts and beams embrace between them a free run of the continuous strip of sheet material 20, which is fed continuously by the rolls of a conventional paper making machine, for example, indicated schematically at 22.

The carriages 30 and 32 are mounted on the respective beams 16 and 18 on the guide rails indicated at 17 and 19, and are movable along those rails by mechanism of any suitable type which maintains the two carriages in accurate vertical alignment. For example, the carriages may be connected to continuous loops of chain, not explicitly shown, which are supported on sprockets and driven at equal speeds by the electric motor 40. The resulting synchronous back and forth movements of the carriages along their tracks may be periodic and essentially continuous, or may be so controlled as to produce single transverse scans of web 20 only intermittently. Rails 17 and 19 extend to the side of web 20 far enough to permit the carriages to be moved off web at one or both sides.

Carriages 30 and 32 carry the respective transducer assemblies 70 and 80. The cylindrical support 42 is mounted on upper carriage 30 by means of the brackets 44, which permit convenient adjustment of the support transversely of its vertical axis 41. The mounting sleeve 40 is fittingly received in support 42 and is axially adjustable by means of the externally mounted flange 45 and adjustment screws 46. Upper transducer assembly 70 is supported in guided relation to mounting sleeve 40 in a manner permitting the transducer to float essentially freely within a limited range of axial movement. For that purpose, the annular inertial mass 90 is freely slidable within the sleeve and has an internal coaxial bore 92 in which the tube 94 is freely received (FIG. 3). Transducer assembly 70 is rigidly mounted on the lower end of that tube. The peripheral flange 75 on the transducer assembly projects upwardly within sleeve 40 and is axially slotted at 76 to receive the pins 77, rigidly mounted on the sleeve. The free fit of pins 77 in slots 76 prevents appreciable rotation of the transducer assembly with respect to sleeve 40, but permits free relative axial movement within the limited range defined by the length of the slots.

The compression coil spring 96 has its upper end seated on mass 90 and its lower end supported by the washer 97 on tube 94. Thus the spring, on the one hand, supports mass 90 on the tube and, on the other hand, yieldably urges the tube and its carried transducer assembly downward toward web 20 with a biasing force determined primarily by the weight of mass 90. Axial movement of tube 94 relative to inertial mass 90 is damped in any suitable manner, preferably by providing a film of a suitable viscous fluid in the slight annular clearance 98 between the tube and bore 92. Both friction and damping between inertial mass 90 and the internal cylindrical surface 43 of sleeve 40 are preferably minimized, as by high polish and free fit of the contacting surfaces.

Lower transducer assembly 80 is mounted on lower carriage 32 by means of the cylindrical support 52 and the mounting sleeve 50. Support 52 is held by the brackets 54, which permit transverse adjustment of the support axis 51. Once the upper and lower support axes 41 and 51 have been aligned, that relation is maintained within the accuracy defined by the guide rails and drive system of carriages 30 and 32. The mounting sleeve 50 is fittingly received in cylindrical support 52 and is shiftable axially in that support between an upper, extended working position and a lower, retracted idle position. That movement is typically controlled by the piston 58, which works in the air cylinder 56 and supports sleeve 50 by means of the piston rod 62 and the transverse mounting plate 60. When the instrument is in use air pressure is normally supplied to the lower end of cylinder 56 via the flexible conduit 64 and a 3-way valve indicated schematically at 65 (FIG. 2). Piston 58 is thereby raised against the positive stop 66, which may be adjustable to modify the normal operating level of sleeve 50. When the instrument is to be shut down or moved off web for any reason, valve 65 is operated to connect conduit 64 to atmospheric pressure. Under that condition, or if pressure should be accidently cut off, piston 58 is free to slide down in cylinder 56 under the weight of sleeve 50 and its carried transducer assembly 80, thereby removing that assembly from the vicinity of web 20.

The actual transducer structure may be of any type capable of penetrating the material of web 20 and producing an output signal that represents the vertical separation of the two transducer elements and is not otherwise affected by any normally occurring variations in the thickness or other properties of the web. In the preferred form illustratively shown, the transducer is electromagnetic and can be used with webs of any nonmagnetic material.

Lower transducer assembly 80 comprises the plate 82 of magnetically permeable material with the horizontal annular working face 84. Plate 82 is carried on the reinforcing support 83, rigidly mounted on the upper end of sleeve 50. Upper transducer assembly 70 comprises a plurality of electromagnetic transducer units 86, mounted on the annular mounting plate 72 of non-magnetic material. Any desired number of transducer units 86 may be employed, typically arranged at equal radii from support axis 41 and at uniform angular spacing about that axis. Transducer units 86 are typically potted in cylindrical containers and inserted from above into bores in mounting plate 72 with their pole faces 89 accurately positioned in a common plane perpendicular to axis 71.

Each of the transducer units 86 typically comprises a laminated magnetic core 87 of U-form carrying an electrical winding 88 through which alternating current is passed from a suitable source including an oscillator. Current in coil 88 produces magnetic lines of force 91 in core 87 which extend between the two core pole faces 89 via a path that extends through web 20 and plate 82 of lower transducer element 80 on the opposite side of web 20, as shown best in FIG. 5. Hence the effective impedance of winding 88 depends critically upon the air gap between pole faces 89 of one transducer element and face 84 of plate 82 of the other. Many different circuit arrangements are well known for sensing variations of impedance of the windings 88, which are typically connected in series via the wires 85 so that their respective contributions to the output signal are effectively averaged.

The downward force of mass 90 acting on upper transducer assembly 70 is supported relative to web 20 by a film of pressurized air at the center of support plate 74. That air film is formed by air escaping through the cylindrical body 100 of porous material such, for example, as sintered bronze. Body 100 is contained in the cup 102 which is axially adjustable within the lower end of tube 94 and is locked in selected position in that tube by the set screws 103 (FIG. 3). Air at uniform pressure is supplied to the upper surface of body 100 through a bore in cup 102 from the flexible air hose 106. That air seeps through porous body 100, escaping under essentially uniform conditions from its entire lower surface 101. The lower circular edge 104 of cup 102 lies accurately in a plane perpendicular to axis 41 and spaced appreciably below the lower face of support plate 74. Edge 104 preferably extends slightly below the air emitting surface 101 of the porous body. Thus a small chamber is formed between surface 101 and the upper face of web 20 from which air transmitted through the porous body escapes through the relatively narrow gap formed between edge 104 and the web. For a given air supply pressure and a given biasing force to be supported, the resulting air flow maintains a definite and uniform spacing between edge 104 and the web.

Web 20 is supported in accurately spaced relation above lower transducer element 82 by a generally similar air film. That film is produced by air escaping upward through the cylindrical porous body 110, which is mounted in the cup 112. That cup is supported coaxially in adjustable position by the set screws 113 and is supplied with air under uniform pressure through the flexible hose 114. The upper, air emitting face 115 of porous body 110 is positioned appreciably above transducer face 84. Working face 115 is preferably accurately flat and considerably larger in diameter than the air film formed on the opposite side of web 20 by porous body 100 and rim 104.

That dimensional relation has the advantage that a slight mutual offset of the axes 41 and 51 of the upper and lower transducer elements, such as may result from imperfectly coordinated guidance or drive of upper and lower carriages 30 and 32, does not affect the effective thickness of the two air films. As illustrated schematically in FIG. 6, despite such offset, the defining rim 104 about upper air bearing 100 remains well within the periphery of lower air bearing 110. Also, slight angular misalignment of the two transducer assemblies, as shown with intentional exaggeration in FIG. 7, can cause only second order variations in the output, since the average spacing of rim 104 tends to remain constant, and the average air gap between the several transducer elements 86 and plate 82 also tends to remain constant.

Since the air film thickness produced by the air bearings depends directly upon the supply air pressure, satisfactory operation of the instrument requires very accurate control of that pressure. It has been found sufficient to rely upon conventional gas pressure regulators, particularly if two regulators are used in series. Humidity and cleanliness of the air are also rigorously controlled, typically by conventional means.

Support cylinders 40 and 50 also carry mechanism for approximately defining the level of web 20 at points spaced from the transducer, thus leading the moving web gradually to the transducer without any sharp bends. That mechanism typically comprises two sets of mutually opposed linearly elongated air bearings, the bearings of one set extending transversely above and below the web upstream of the transducer, and the bearings of the other set being similarly located downstream of the transducer. Each of those auxiliary air bearings comprises a bar 124 having a longitudinal recess 125 in which is set an element 126 of solid porous material to which air is supplied via flexible tubes 129. The edges 127 of recess 125 define a horizontal plane 130 which may be considered as the working surface of the air bearing. The front surface of porous element 126 is preferably set slightly back of that surface.

Bars 124 are carried on the respective cylinders 40 and 50 by the brackets 128, which are preferably axially adjustable, as by suitable clamp structures. The brackets are so set that the auxiliary air bearings hold the web at a level slightly offset, preferably upwards, from the level to which it is constrained at the transducer. A very slight bend is then formed in the web as it passes the transducer. Such a bend maintains always the same sense, so that normally occurring fluctuations during operation cannot cause the web to bend first in one direction and then in the other. That arrangement has been found to yield improved accuracy and linearity of output.

The auxiliary air bearings of each set are preferably spaced farther apart than the normal operating separation of transducer air bearing faces 104 and 115, thus defining the level of the web only approximately. Hence, as the web moves past the transducer it is permitted to conform gradually and progressively to the precisely defined level at the transducer, reducing the drag on the web and minimizing any tendency to cause oscillations or waves in the web. Both the separation of the upper and lower auxiliary air bearings and their offset in level from the transducer bearings are somewhat exaggerated in FIG. 2 for clarity of illustration. The upper auxiliary air bearings may be supported, if desired, in a manner that permits some floating action, such as has been described for the upper transducer assembly. However, excellent results have been obtained with the rigid mounting arrangement that has been described.

Suitable energization of electromagnetic units 86 and the amplification and other processing of the signal from the transducer are typically performed by conventional circuitry, represented schematically at 142 in FIG. 4. The resulting final output signal may be utilized in any desired manner, such as for visual display on a meter calibrated so that it will read directly in terms of the thickness of web 20. Such a meter is indicated schematically at 140 in FIGS. 1 and 4.

It will be understood that many changes can be made in the particulars of the described structure without departing from the essence of the present invention. For example, either or both of the transducer assemblies may be mounted for axial floating movement such as that described for the upper transducer assembly. Also either or both of the assemblies may be made retractable for moving the instrument on and off web. Such retraction may be made responsive to such abnormal conditions as a broken web, for example, by use of signal systems normally available in production plants. Whereas the invention has been described with particular reference to measurement of the thickness of paper, that use is merely illustrative.

I claim:

1. Mechanism responsive to the thickness of a sheet movable in its plane, comprising in combination
   a transducer comprising first and second mutually spaced transducer assemblies having a common axis and producing a signal responsive to the mutual axial spacing of the assemblies, structure mounting one of the assemblies on one side of the sheet with said common axis transverse of the sheet, structure mounting the other assembly on said common axis on the other side of the sheet and comprising a support, a body having a mass greater than the mass of said other assembly, structure guiding the body and said other assembly for respective parallel translational movements relative to each other and relative to the support in a direction substantially parallel to said common axis, and damping means acting between the body and the other assembly for damping the relative movement thereof, means yieldably biasing the assemblies toward each other, first air bearing means for maintaining a constant distance between the sheet and said one transducer assembly, second air bearing means for maintaining a constant distance between the other transducer assembly and the sheet, and output means responsive to the transducer signal for representing the thickness of the sheet.

2. Mechanism as defined in claim 1, and in which the plane of said sheet is substantially horizontal, said one transducer assembly is mounted below the sheet, and said biasing means comprise resilient means urging said other transducer assembly downwardly relative to the body, upward force of said resilient means on the body being balanced primarily by weight of the body.

3. Mechanism as defined in claim 1, and in which said guiding structure produces substantially zero damping of said body movement.

4. Mechanism as defined in claim 1, and in which said air bearing means include porous structures having outlet surfaces facing the sheet, and means for expelling air at uniform rate from the outlet surfaces of the porous structures.

5. Mechanism as defined in claim 4, and in which the outlet surface of the porous structure associated with said one transducer assembly is accurately flat, and the outlet surface of the porous structure associated with the other transducer assembly is surrounded by an annular flange that projects from that outlet surface toward the sheet.

6. Mechanism as defined in claim 5, and in which the outlet surface of the porous structure associated with said one transducer assembly is larger in area than the outlet surface of the other porous structure and extends beyond said flange in all directions laterally of the sheet.

7. Mechanism as defined in claim 4, and in which one transducer assembly comprises a flat body of magnetically permeable material surrounding the associated porous structure in a plane parallel to the sheet, the other transducer assembly comprises a plurality of transducer elements angularly distributed about the associated porous structure and each adapted to cooperate electromagnetically with said flat body to produce a signal responsive to the element spacing therefrom, said transducer elements being electrically connected to supply to said output means a signal representing the average response of the elements.

8. Mechanism as defined in claim 1, and in which said sheet is movable in a predetermined direction, and said mechanism includes also auxiliary air bearings mounted upstream of the respective transducer assemblies and with respective working faces opposedly spaced from each other on opposite sides of the sheet, and means for expelling air through the working faces of the auxiliary air bearings to guide the sheet toward said first and second air bearings.

9. Mechanism responsive to the thickness of a sheet of flexible material movable in its plane in a predetermined direction, comprising in combination a transducer comprising first and second mutually spaced transducer assemblies having a common axis and producing a signal responsive to the mutual axial spacing of the assemblies, structure mounting the transducer assemblies on said common axis on opposite sides of the sheet for mutual translational movement substantially parallel to the axis, means yieldably biasing the assemblies toward each other, main air bearings mounted in definite spatial relation to the respective transducer assemblies and having working faces mutually opposed on opposite sides of the sheet adjacent the axis, auxiliary air bearings mounted on opposite sides of the sheet and having working faces opposedly spaced from each other and spaced upstream from the axis and from the main air bearings, the sheet being unsupported between the auxiliary air bearings and the main air bearings, means for expelling air through the working faces of the auxiliary air bearings to limit transverse sheet movement and thereby guide the sheet toward the main bearings without mechanically contacting the sheet, means for expelling air through the working faces of the main air bearings to maintain constant axial spacings between the respective transducer assemblies and the sheet, and output means responsive to the transducer signal for representing the thickness of the sheet.

10. Mechanism as defined in claim 9, and including also second auxiliary air bearings mounted on opposite sides of the sheet and having working faces opposedly spaced from each other and spaced downstream from the axis and from the main air bearings, the sheet being unsupported between the second auxiliary air bearings and the main air bearings, and means for expelling air through the working faces of the second auxiliary air bearings to limit transverse sheet movement and thereby guide the sheet leaving the main air bearings without mechanically contacting the sheet.

11. Mechanism as defined in claim 10, and in which the working faces of the air bearings and the transducer assembly on one side of the sheet are mounted normally in mutually fixed relation, with the working face of the main air bearing spaced from the sheet back of the plane of the working faces of the auxiliary air bearings.

12. Mechanism responsive to the thickness of a sheet movable in its plane, comprising in combination a transducer comprising first and second mutually spaced transducer assemblies having a common axis and producing a signal responsive to the mutual axial spacing of the assemblies, structure mounting the transducer assemblies on said common axis on opposite sides of the sheet for mutual translational movement substantially parallel to the axis, means yieldably biasing the assemblies toward each other, air bearings mounted in definite spatial relation to the respective transducer assemblies and including porous structures having outlet surfaces facing opposite sides of the sheet, one of the outlet surfaces being surrounded by an annular flange that projects from that outlet surface toward the sheet,
and the other outlet surface being larger than said flange and being accurately flat,
means for expelling air through the outlet surfaces of the air bearings to maintain constant axial spacings between the respective transducer assemblies and the sheet,
and output means responsive to the transducer signal for representing the thickness of the sheet.

References Cited

UNITED STATES PATENTS

| 2,678,173 | 5/1954 | Phelps. | |
| 2,665,333 | 1/1954 | Dunipace et al. | 324—34 |
| 3,304,615 | 2/1967 | Ward et al. | 324—34 XR |

ALFRED E. SMITH, Primary Examiner

U.S. Cl. X.R.

33—143